US006260620B1

(12) United States Patent
Furman et al.

(10) Patent No.: US 6,260,620 B1
(45) Date of Patent: Jul. 17, 2001

(54) PROCESS OF SEPARATING EXCESS WATER OR SLUDGE FROM RECOVERED CRUDE PETROLEUM OIL

(75) Inventors: Harvey A. Furman, Old Bridge; Kenneth R. Cioletti, Passaic, both of NJ (US)

(73) Assignee: Nor Industries, Inc., Secaucus, NJ (US)

( * ) Notice: Subject to any disclaimer, the term of this patent is extended or adjusted under 35 U.S.C. 154(b) by 0 days.

(21) Appl. No.: 09/670,833

(22) Filed: Sep. 28, 2000

Related U.S. Application Data

(60) Division of application No. 09/051,167, filed as application No. PCT/US96/15840 on Oct. 3, 1996, now Pat. No. 6,173,776, which is a continuation-in-part of application No. 08/538,262, filed on Oct. 3, 1995, now abandoned.

(51) Int. Cl.[7] ............... B01D 17/02; C02F 9/02; C10G 33/04; F21B 43/34
(52) U.S. Cl. .......... 166/267; 208/188; 210/708; 210/728
(58) Field of Search ............... 166/267, 75.12; 208/187, 188, 291; 210/708, 728

(56) References Cited

U.S. PATENT DOCUMENTS

| | | | | |
|---|---|---|---|---|
| 2,881,204 | * | 4/1959 | Kirkpatrick | 208/188 X |
| 3,505,307 | * | 4/1970 | Foehr | 208/188 |
| 4,029,570 | * | 6/1977 | Coffman et al. | 166/267 X |
| 4,186,802 | | 2/1980 | Periman | 166/280 |
| 4,302,326 | * | 11/1981 | Bialek | 166/267 X |
| 4,416,754 | * | 11/1983 | Merchant, Jr. et al. | 210/708 X |
| 4,419,265 | * | 12/1983 | Diery et al. | 166/267 X |
| 4,539,100 | | 9/1985 | Ronden . | |
| 4,548,707 | * | 10/1985 | Wolf et al. | 166/267 X |
| 4,737,265 | * | 4/1988 | Merchant, Jr. et al. | 166/267 X |
| 5,407,585 | * | 4/1995 | Taylor et al. | 210/708 |
| 5,421,907 | | 6/1995 | Nieendick et al. . | |
| 5,759,409 | * | 6/1998 | Knauf et al. | 210/708 |
| 5,858,247 | * | 1/1999 | Campbell | 210/708 |
| 6,039,880 | * | 3/2000 | Morataya | 210/708 |

* cited by examiner

Primary Examiner—George Suchfield
(74) Attorney, Agent, or Firm—Banner & Witcoff, Ltd.

(57) ABSTRACT

A method for separating excess water, sludge, or both, from recovered crude petroleum oil. The method comprises adding to crude petroleum oil a composition comprising about 40 to 99 wt % of a fatty acid alkyl ester blend and about 1 to 25 wt % of at least one lower alkyl glycol ether, and then agitating the mixture.

15 Claims, No Drawings

PROCESS OF SEPARATING EXCESS WATER OR SLUDGE FROM RECOVERED CRUDE PETROLEUM OIL

This application is a divisional of Ser. No. 09/051,167 filed on Dec. 24, 1998, now U.S. Pat. No. 6,173,776 which is a 371 of PCT/US96/15840 filed Oct 3, 1996, which is a continuation-in-part of U.S. Ser. No. 08/538,262 filed Oct. 3, 1995, now abandoned.

FIELD OF THE INVENTION

This invention relates to the use of high flash point, low vapor pressure compositions for injection into, and coating of, gas and oil wells and surrounding underground formations, and processing equipment for the purpose of removing scale, paraffins, tars, and other viscous constituents. Treatment results in increased flow of gas and/or oil and decreased adhesion of soils and scale in all aspects of oil and gas recovery, including formations, casing perforations, casings, lines, tanks, and pumping equipment.

BACKGROUND OF THE INVENTION

The efficient recovery of oil and gas from wells depends on maintaining clean formations, casing perforations, lines and pumping equipment. Oil wells have a problem with the build up of paraffins, sulfur, scale, heavy oil, and tar by-products. These residues foul the wells and the casing perforations and the lines that carry the oil or gas to the surface, and foul the pumps and metal rods which are used to recover the oil or gas from the well.

Typical prior art methods consist of four major types of products. The first method uses aggressive blends of aromatic and/or aliphatic petroleum hydrocarbons or halogenated hydrocarbons. These products may not contain surfactants to allow the products to mix with and emulsify in water to increase cleaning efficiency. The presence of water decreases the efficiency of these compositions significantly. Pure solvent blends are immiscible in water and cannot penetrate to the soils. The addition of emulsifiers allows the solvents to blend with the water, but the resulting solvent/emulsion system is not as efficient a cleaner as the pure solvent.

The second method is the use of bacteria to digest the paraffinic and tar-based soils. This system is very dependent on well temperature and is sensitive to environmental factors such as the composition of the oil. This process is typically slower than the solvent-based process.

The third method is predicated on water-based aline, hard-surface cleaners. These cleaners generally incorporate aline builders, water-soluble solvents, such as glycol ethers, alcohols, and surfactants. Alkaline builders consist of hydroxide, carbonate, phosphate, and silicate. Water-soluble solvents typically consist of ethylene glycol, diethylene glycol, propylene glycol and dipropylene glycol ethers. Typical surfactants are the categories of alkyl phenol ethoxylates, linear alcohol ethoxylates, or alkyl sulfonates, amphoterics, and fatty acid soaps of alk anolamides. The cleaning efficiency of these alkaline compositions on paraffins and other oil based soils is typically much lower than that of solvent blends. Further, these compositions are not effective for removing scale.

The fourth method of cleaning involves the use of hot oil, which is injected into the well. The hot oil melts and dissolves the paraffins and other oil byproducts and carries them to the surface. Although this method is efficient, the use of hot oil creates a hazardous condition and can adversely affect the wells.

Typical prior art compositions employ solvents of aromatic and/or aliphatic petroleum hydrocarbons or halogenated hydrocarbons. These solvents produce vapor emissions, commonly known as "VOCs" (volatile organic compounds), which typically are toxic. Other cleaning compositions require little or no VOCs, but require high levels of caustic and/or phosphates which cause problems in transportation, use, and disposal.

There are many problems associid with the above-mentioned methods and solvents. For example, halogenated hydrocarbons affect worker health adversely and are ozone-depleting chemicals. Some of the solvents and methods may adversely affect the quality of the oil or gas. Many of the non-halogenated solvents used are either flammable or combustible, resulting in increased fire and explosion risks and higher insurance premiums. Furthermore, the dppos of the spent solvents, in accordance with government regulations, is expensive. In fact, most of the halogenated solvents are subject to high taxes and are in the process of being phased out. In addition to the above-mentioned problems, limits on the amount of VOCs that may be emitted into the atmosphere are set by the Environmental protection Agency, as fled by the "Clean Air Act." These limits are determined by the solvent content of the coming production of raw material versus the solvent content of the waste or finished products.

The bacteria-based cleaning solution also has other disadvantages. The treatment requires that the well be shut down for two weeks to allow the establishment of a bacterial colony. When pumping is resumed, the bacteria are removed with the oil, which results in rapid depletion of the colony and retreatment is required.

SUMMARY OF THE INVENTION

An object of the present invention is to provide a method of cleaning gas and oil wells, equipment, well casing perforations, and surrounding formations, pumps, as well as lines, pipes, and the like using an effective cleaning composition which is free of objectionable petroleumderved or halogenated hydrocarbon and alkaline solvents and useful in removing most of the soils and scale encountered in gas- and oil-well cleaning operations.

Another object is to use a composition which is safe and biodegradable.

A further object is to use a composition capable of functioning at ambient temperatures and at elevated temperatures.

A further object is to use a safe liquid cleaning composition containing fatty acid methyl esters and lower alkyl glycol ethers, which is effective in removing paraffins, tars, related soils, and scale from gas- and oil-wells, casings and equipment.

An additional object is to use a low VOC composition (<50%), which is effective as a cleaner for gas- and oil-wells, casings and equipment.

An additional object of the invention is to use a composition with a flash point above 200° F.

A further object is to use a composition which will produce a coating on well casings, lines, pumps, pipes and other equipment, to prevent the adhesion and accumulation of paraffins, other related soils, and scale on these parts, to help retard corrosion, and to allow more efficient operation and consistent production between cleanings.

An additional object is to provide a composition which is low evaporative, widely dispersive, and results in differential wetting of well structures and equipment.

An additional object is to provide enhanced gas and oil recovery from wells.

A further object is a method to share excess water from recovered crude petroleum oil.

The present invention is directed to a method for removing and preventing the buildup of soils, scale, or both, from gas or oil wells, hydrocarbon bearing formations, and recovery, pumping, storage, and transmission equipment, comprising introducing into said well, formation or equipment a composition comprising about 40 to 99 wt % of a fatty acid alkyl ester blend and about 1 to 25 wt % of at least one lower alkyl glycol ether.

The present invention is also directed to a method for separating excess water, sludge, or both, from recovered crude petroleum oil comprising adding to the crude petroleum oil a composition comprising about 40 to 99 wt % of a fatty acid alkyl ester blend and about 1 to 25 wt % of at least one lower alkyl glycol ether, and then agitating the mixture.

In addition, the present invention provides an improved fracing process of forcing sand and/or another granular material into an oil or gas formation under pressure, whereby the improvement comprises mixing the sand with a composition comprising about 40 to 99 wt % of a fatty acid alkyl ester blend and about 1 to 25 wt % of at least one lower alkyl glycol ether.

DETAILED DESCRIPTION OF THE PREFERRED EMBODIMENTS

The most common industrial uses of fatty acid alkyl ester blends are as industrial metal working lubricants, in soap manufacturing, as a plasticizer for waxes and as solvents in the formulation of industrial oils and leather treating compounds. These compounds are also used as textile lubricants and foam depressants, and also in the formulation of low VOC press washes.

It was discovered that combining fatty acid alkyl ester blends with lower alkyl glycol ethers provides cleaning compositions having excellent properties, i.e., high flash point, good soil and paraffin penetration, and excellent protection against resoiling and scale buildup. The compositions used in the methods of the present invention are blended to provide low VOCs (less than 50%) and to provide a composition with a flash point above 200° F. TCC (tag closed cup). The compositions are also safe and biodegradable.

The present invention is direct to methods for removing and preventing the buildup of paraffins, other related soils, and scale from gas and oil wells, hydrocarbon bearing formations, and recovery, pumping, storage, and transmission equipment by injecting into the wells and such equipment cleaning composition comprising about 40 to 99% by weight of a fatty acid alkyl ester blend; and about 1 to 25 % by weight of at least one lower alkyl glycol ether, with the remainder being suitable additives. Preferably the composition contains about 60 to 95% by weight, more preferably about 80 to 90% by weight, of the fatty acid alkyl ester blend, and preferably about 1 to 15 % by weight of the lower alkyl glycol ether.

There are many types of soils which buildup in gas and oil wells and processing equipment, such as paraffins, tar by-products, and other viscous soils. Further, the buildup of scale is a problem in such wells and equipment Scale is typically, but not limited to, the accumulation of calcium carbonate deposits and/or iron oxide and other hard residual deposits. The composition of the present invention is effective to remove many types of soils and scale associated with gas and oil recovery and processing and thus enhance the oil recovery process.

The gas and oil processing equipment includes all types and varieties of equipment associated with gas and oil recovery and processing, for example, gas and oil well casings, pumps, pipes, lines, tanls, and the like. It is contemplated that the present composition may be used with all such equipment.

There are several ways that the method of removing or preventing soils and/or scale buildup in gas and oil wells and equipment may be implemented using a composition in accordance with the present invention.

In addition to cleaning the wells and associated equipment, it is often desirable to introduce the composition, through the perforations in the casing, into the surrounding formation. The composition may be forced into the surrounding formation by applied pressure or, if the composition is allowed to set at the bottom of the casing, the composition may seep into the formation without additional pressure. The composition permeates the formation, dissolvmg blockages in the formation to provide more efficient oil and gas recovery.

A method of cleaning and maintaining a working well, including the surrounding foraton, includes the steps of pouring or injecting the composition down the casing side (back lines) of a well and allowing it to mix with the fluid which is aaeady in the well. When enough fluid is pMmet, d composition is feni clad by a pump for 24–72 hours, preferably 48–72 hours. Prior to circulating, the composition may be allowed to set for 8 to 24 hours, for example. The setting time, circulating time and dosage depend on the amount of soil and/or scale anticipated to be present as well as the depth of the well. A basic initial dosage can be, but is not limited to, 20 gallons of composition and for maintaining a clear structure, at least about 5 gallons of composition per well on a periodic basis, e.g. biweekly, monthly, bimonthly.

If there is a great amount of soil and/or scale present in the well or associated equipment, if the pump or rods are frozen, or if the surrounding formation is clogged, alternative methods may be necessary. Thus another method of cleaning and maintaining a working well, including the surrounding fonmation, initially mixes oil and the composition at ambient temperatures and then introduces the mixture into the casing. The ratio of oil and composition and the amount of the mixture introduced depends on the amount and type of soil and scale present in the well and on associated equipment. The mixture can contain about 10–200 gallons of composition for every 40 barrels of oil. Preferably the mixture contains about 20 gallons of composition for every 40 barrels of oil. The mixture is pumped down the backside or casing side of the well. The mixture is usually allowed to set prior to circiating. The mixture may be used at ambient temperature or may be heated to 150–160° F. prior to introduction to the well.

In another embodiment, the composition and oil may be introduced into the well separately, at ambient or elevated temperatures, preferably with the composition being introduced first and forced into the formation by the weight of the oil. The mixture may then be allowed to set, circulated, or both.

In other embodiments water is substituted for the oil. As with the oil, the water and composition may be mixed prior to introduction to the well or introduced separately. The water temperature may be ambient tem re or elevated to about 150–160° F. Again, the mixture may be allowed to set, circulated, or both.

After introducing into a well, the composition of the present invention coats the surfaces of the well, formations, and asced equipment to clean and to prevent the future adhesion and accumulation of parafins, other soils, and scale. The composition may also be applied directly to the equpment For example, prior to placing rods and casings into gas andlor oil wells, these parts may be sprayed with the composition, or the parts may be diped into tanks filled with the composition to prevent corrosion and buildup of scale and soils.

The composition may be introduced by means of injection pumps into off-shore gas or oil wells to reduce soils, particularly paraffin, or scale adhesion in well casings and transmission lines. In addition to the problems associated with land oil wells, off shore wells have the flrther problem of the ocean or sea water behaving as a coolant of the lines and contents between the bottom of the ocean and the platform. Thus off shore wells have a particular problem with paraffin buildup. To treat the lines, 40–50 gallons of the composition, for example, are d into the lines. Preferably, the composition is heated prior to being introduced into the lines.

The composition used in the methods of the claimed invention contains ingrients in amounts effective to clean the wells, formations, and equipment and/or to provide an effective coating on their suufaees to prevent f buildup of soils and scale and corrosion. The composition is low evaporative and provides differential wetting of the surfaces; thus, the composition will not evaporate to any significant extent and it will provide a coating that remains on the surface for useful periods of time.

The fatty acid alkyl ester blends useful in compositions of the present invention preferably contain $C_2$ to $C_8$ esters of $C_4$ to $C_{22}$ fatty acids having the fonnula:

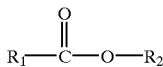

wherein $R_1$ is $C_4$ to $C_{22}$ alkyl and $R_2$ is $C_1$ to $C_8$ alkyl. Fatty acid esters are derived from natural products, and thus corise mare tand one ester; hence blend. Typically, fatty acid esters are derived from the esterification of fatty acids or the transesterification of animal fats or vegetable oils.

The fatty acid alkyl ester blend more preferably contains methyl, ethyl, n-propyl, isopropyl, or n-butyl esters of $C_4$ to $C_{22}$ fatty acids. Most preferably, the fatty acid alkyl ester blend contains methyl esters. The fatty acid methyl ester blends are preferably blends with a cloud point of 40° F. and a high degree of unsaturation to increase solvency. More preferably, the fatty acid methyl ester blends are derived from soya, canola, and other vegetable oils, with a cloud point of 20°–32° F. and an iodine value of 90–130.

1 to 25 wt. % of a lower alkyl glycol ether may be added as a penetrant, to reduce viscosity of the mixture, as a coupling agent, and/or to increase efficacy on hydrophilic soils. Examples of lower alkyl glycol ethers useful in the present composition include dipropylene glycol monomethyl ether, tripropylene glycol monomethyl ether, ethylene and diethylene glycol ether, methyl, ethyl, propyl and butyl ethers, such as ethylene glycol monobutyl ether, or mixtures thereof.

A polyoxyalkylene glycol ether may be present in the composition in amounts of about 1 to 40 wt. %, preferably 3 to 25 wt. %, and most preferably 3 to 10 wt. %. The actual amount utilize depends on the types of soil present in the equipment to be cleaned and on the water content of the well or equipment being cleaned. Preferably used are polyethylene glycol ethers and polypropylene glycol ethers having the formulas:

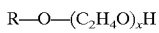

and

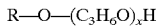

where, in each fonmula, R is $C_1$ to $C_8$ alkyl and x is greater tand 4. R is preferably methyl, ethyl, propyl, or butyl. More preferably, the polyoxyalkylene glycol ether is an n-butoxy polyalkylene glycol ether. Commercal polyoxyalkylene glycol ether formulations available include Macol 300, Macol 660, WSL-2000,WSL-3520, and WSL-5100 produced by PPG Mazer, Gurnee, Ill. The polyoxyalkylene glycol ether preferably has a molecular weight of between about 200 and 600 and a viscosity of between about 15 and 150 cps when measured at 25° C. using a Brookfield LVT Viscometer with a No.2 spindle at 60 r.p.m.

Preferably, at least 1 wt %, more preferably, 1.5 to 3 wt %, of antioxidants are included in the composition. Antioxidants suitable for the present invention include, but are not limited to, (BHT) 2,6-di-tert-butyl-para-cresol, (BHA) 2,6di-tert-butyl-para-anisole, Eastman inhibitor O A B M-oxalyl bis(bezylidenehydrazide), and Eastman DTBMA 2,5-di-tert-butylhydroquinone. A surfactant may also be added to the composition. Any surfactant suitable for use in cleaning oily soils may be used, such as ethoxylated nonylphenols, linear alcohol ethoxylates, alkanolamine salts of dodecylbenzene sulfonic acid, sulfosuccinates, phosphate esters, alcohol sulfates, quaternary ammonium compounds, amphoteric surfactants, alpha-olefin sulfonates, sorbitan, and fatty acid derivatives. The surfactant is added in an amount effective to perform as a wetting agent and emulsifier, and usually up to 10 wt. %, preferably 1–3 wt %, of the composition.

Commercial surfactants include the EXXATE series of surfactants obtained from EXXON. EXXATE 1000 is an acetic acid ester of $C_9$–$C_{11}$, branched oxoalcohol. DBE (DuPont) is a blend of 45–75 wt. % dimethyl glutarate, 10–25 wt. % dimethyl adipate, and 15–30 wt. % dimethyl succinate.

Up to 50 wt. % of other additives may be added, as needed, for particular applications, such as to vary the VOC levels, increase penetration of the mixture, decrease viscosity of the mixture, as couplers for solvents insoluble in the mixture, and to provide solvents for oleophilic and hydrophilic soils. It is within the skill of the art to deternine the amount and type of additive needed for a particular application.

Suitable additives include trpenes, terpene alcohols, $C_8$–$C_{14}$ alcohol ester blends, glycols, acid esters, diacid esters, petroleum hydroerbons, amino acids, alkanolamines, and amines. Exaples of tpenes include d-limonene and α and β pinene and terpene alcohols, including a-terpineol. $C_8$–$C_{14}$ alcohol ester blends include EXXATE 900, 1000, and 1300 from Exxon Chemical; glycols include propylene glycol, dipropylene glycol, and tripropylene glycol. Acid esters include methyl oleate and methyl linoleate, and diacid esters include methyl or butyl diesters of glutaric, adipic, and succinic acids. Petroleum hydrocarbons include AROMATIC 100, AROMATIC 150, ISOPAR M, and ISOPAR K.

Amines such as morpholene, 1,3-dimethyl-2-imidazolidinone, 1,3 propanediamine, 2-amino-1,3-propanediol, and 3-amino prpanol, and alkanolamines such as triethanolamine, diethanolaine, 2-aniinomethyl propanol, and monoethanolamine act as dispersants for soils and solubilize fatty acids and oils. Amino acids, such as choline and choline hydroxide, provide nontoxic alternatives to monoethanolamine, and act as metal chelators, preferably, methyl or isobutylesers of $C_4$–$C_6$ aliphatic dibasic esters and n-methyl-2 pyrrolidone. Preferably up to 5 wt % of n-methyl-2 pyrrolidone is included.

Other additives typically used in cleaning compositions may be used, including water softening agents, sequesterants, and corrosion inhibitors, which are added in amounts effective to perform their intended function. These additives and amounts thereof are well within the skill of the art. Suitable water softening agents include linear phosphates, styrene-maleic acid copolymers, and polyacrylates. Suitable sequesterants include 1,3-dimethyl-2-imidazolidinone, 1-phenyl-3-isoheptyl-1,3-propanedione, and 2-hydroxy-5-nonylacetophenoneoxime. Examples of corrosion inhibitors include 2-aminomethyl propanol, diethylethanolamine benzotriazole, and methyl benzotriazole.

All additives preferably have a flash point greater than 190° F. TCC in order to achieve a final composition flash point greater than 200° F.

Typical treatment of a well requires pumping the cleaning solution into the well casing, and circulating the solution from 24 to 72 hours. A typical well has a 4-½" casing which extends down through the depth of the well. The 4-½" casing at the surface is capped by a well head. The well head has a fitting on top through which 2-⅜" tubing is inserted. The tubing can extend to the bottom of the well and can be removed in sections for cleaning and maintenance. There are two 2-inch ports on the side of the well head which support the back lines. The normal procedure consists of injecting 5 to 20 gallons of the cleaning solution into the casing side of the well (back lines), and circulating it up the central 2-⅜" tubing. The depth of the well, casing diameter, and anticipated amount and nature of the soils, determine the exact dosage needed. The flow of the cleaning solution is maintained for 24 to 72 hours to remove all soils. Depending on buildup, repeated treatments may be provided every 2 to 3 weeks.

Another embodiment of the present invention is directed to a method for separating excess water and sludge from recovered crude petroleum oil. Crude oil contaminated with sludge and/or water is not pure enough for resale. The water or sludge is generally removed by "rolling" the tank via injecting natural gas under pressure or by adding dry ice to cause agitation of the liquid. The process of oil/water or oil/sludge separation is slow unless an accelerator is added. Thus a further embodiment of the present invention comprises adding to the crude petroleum oil in an amount to accelerate oil/water or oil/sludge separation, a composition comprising about 40 to 99 wt. % of a fatty acid alkyl ester blend and about 1 to 25 wt. % of at least one lower alkyl glycol ether and then agitating to mix.

Typically 1–100 gallons of composition are used to separte water and sludge from 100–400 barrels of oil. The composition is added to the tank and then the tank is "rolled" by introducing natural gas or carbon dioxide for about 24 hours. The use of the composition in the tank resulted in complete sepamion of the water, which was removed from the bottom of the holding tank. Standard indicator test strips or indicator reagents for water in oil indicated no detectable level of water.

Further, the composition may be added to crude oil, in amounts of 0.001 to 0.01% by weight, to reduce the formation of sludge and paraffins in oil transported through transmission pipelines, including offshore pipelines.

Other applications using the composition of the present invention include adding the composition during fracing rcesses, that is the during the process of forcing sand or other material into a hydrocarbon bearing formation under pressure. In accordance with the present invention, the composition is mixed with the sand or other material at a rate of, for example, 1–5 gallons per cubic yard. The sand/composition blend is forced into the a hydrocabon bearing formation by any onie of a variety of methods. Such methods include, but are not limited to, caron dioxide injection, oil injection, gel injection, and sand/slurry injection.

EXAMPLES

In the following examples, the relative effectiveness of the formulation was determined by actual composition performance in the cleaning application.

Example 1

The following compos ition (by weight) was blended:

| | |
|---|---|
| Fatty acid methyl ester | 60% |
| n-Butoxy polyalkylene glycol ether | 20% |
| Dipropylene glycol monomethyl ether | 5% |
| Butylcarbitol | 4% |
| Exxate 1000 (Exxon) | 3% |
| DBE (DuPont) | 3% |
| Tripropylene glycol monomethyl ether | 3% |
| d-Limonene | 1% |
| Nonylphenol 9.5 Mole E.O. | 1% |

At least 1 wt % of antioxidats selected from one or more of BHT, BHA, and Eastman inhibitor OABM were also added A 700 foot well, experiencing problems with paraffin and sludge buildup, was treated with the composition. The composition was introduced in one of two methods. In the first method, five gallons of the mi were poured down the 2" back lines and up the 2-⅜" central tubing. The second method was by chemical injection pump from a small holding tank or chemical pot. The composition was circulated for 48 hours. At the end of this time, operation of the well was resumed. Before cleaning, the daily production of oil was ¼of a barrel. After treatment, daily production increased to two barrels. After 60 days of operation, the tubing was pulled from the well and examined. It was found that the tubing was coated with the cleaning composition and that there was very little adhesion of paraffin and tars to the tubing. Production of oil was still nearly two barels a day.

Example 2

The following composition was blended (by weight):

| | |
|---|---|
| Fatty acid methyl ester | 67.5% |
| n-Butoxy polyalkylene glycol ether | 20.0% |
| Ethylene glycol monobutyl ether | 4.5% |
| Diethylene glycol monobutyl ether | 1.0% |
| Dipropylene glycol monomethyl ether | 1.0% |
| Tripropylene glycol monomethyl ether | 1.0% |
| Exxate 900 (Exxon) | 1.0% |
| Exxate 1000 (Exxon) | 1.0% |

-continued

| | |
|---|---|
| 1-Methyl 2-pyrrolidinone | 1.0% |
| Dibasic esters | 1.0% |

At least 1 wt % of antioxidants selected from one or more of BHT, BHA, and Easan inhibitor OABM were also added A 5,000 foot well which was pumping less han 1 barrel of oil per day on an intermittet bass and producing approximately 20 mcf of gas per day was treated with the composition. First, approximately 20 gallons of the composition was poured down the casing side of the well. This was followed by 40 barrels of lease oil at ambient temperature. The mixture was allowed to set for 48 hours and was then circulated another 24 hours. Thereafter, pumping operations were resumed. The 40 barels of lease oil plus an additional 47 banrrs of oil were recoved in the first 36 hours of pumping. During this period gas, production increased from 20 mcf per day to approximately 150 mcf per day. Afier a period of 30 days, oil production had settled to approximately 12–13 bars per day and gas production to approximately 100 mcf per day.

Example 3

The following composition was blended (by weight):

| | |
|---|---|
| Fatty acid methyl ester | 86.0% |
| Nonylphenol (9.5 mole Ethylene Oxide) | 1.5% |
| Nonylphenol (6.0 mole Ethylene Oxide) | 1.5% |
| Ethylene glycol monobutyl ether | 1.0% |
| Diethylene glycol monomethyl ether | 1.0% |
| Dipropylene glycol monomethyl ether | 1.0% |
| Tripropylene glycol monomethyl ether | 1.0% |
| Exxate 900 (Exxon) | 1.0% |
| Exxate 1000 (Exxon) | 1.0% |
| Exxate 3000 (Exxon) | 1.0% |
| 1-Methyl 2-pyrrolidinone | 1.0% |
| Dibasic esters | 1.0% |

At least 1 wt % of anticxidants selected from one or more of BHT, BHA, and Eastman inhibitor OABM were also added A 5,000 foot well was treated with the composition. This well produced no oil and only about 5 mcf of gas per day. Since the well was clogged with paraffin and other solid soils, the composition was mixed with 40 barrels of lease oil which had been heated to 150–160° F. (Previously, the well had not responded to hot oil treatments.) The heated mixture was poured down the casing side of the well and allowed to set for 48 hours. Thereafter, the mixture was circulated throughout the well for an additional 24 hours. Pumping was then resumed. After the 40 barrels of lease oil were recovered, the well produced 6–7 barrels of oil and 80 mcf of gas per day. These amounts settled to 3–4 barrels of oil and 50 mcf of gas per day after a 30 day period.

Example 4

A composition of the type described in Example 3 was introduced into a 3,000 foot open well with a casing but containing no pump, rods or tubes in a process known as "swabbing." In this case, the weil had been completely shut down due to paraffin and other hydrocarbon blockages. Five gallons of the composition was first poured into the well, followed by 5 baes of water at ambient tuperes. The mixture was allowed to set for 48 hours. Thereafter, the fluid pressures in the well increased significantly and production of oil increased from 0 to 8 barrels per day.

It will be parent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A method for separating excess water, sludge, or both, from recovered crude petroleum oil comprising adding to the crude petroleum oil a composition comprising about 40 to 99 wt % of a fatty acid alkyl ester blend and about 1 to 25 wt % of at least one lower alkyl glycol ether, and then agitating the mixture.

2. A method according to claim 1 wherein about 10 to 200 gallons of the composition are added to 40 barrels of crude petroleum oil.

3. A method according to claim 1 wherein the fatty acid alkyl ester blend contains esters selected from the group consisting of $C_1$ to $C_8$ esters of $C_4$ to $C_{22}$ fatty acids.

4. A method according to claim 3 wherein the fatty acid alkyl ester blend contains esters selected from the group consisting of methyl, ethyl, n-propyl, isopropyl, and n-butyl esters of $C_4$ to $C_{22}$ fatty acids.

5. A method according to claim 4 wherein the fatty acid alkyl ester blend contains esters selected from the group consisting of the methyl esters of $C_4$ to $C_{22}$ fatty acid.

6. A method according to claim 1 wherein the lower alkyl glycol ether is selected from the group consisting of ethylene glycol monobutyl ether, diethylene glycol monobutyl ether, dipropylene glycol monomethyl ether, tripropylene glycol monomethyl ether, and mixtures thereof.

7. A method according to claim 1 wherein the composition further comprises 1 to 40 wt % of polyoxyalkylene glycol ethers.

8. A method according to claim 1 wherein the polyoxyalkylene glycol ether has the formula:

$$R—O(C_2H_4O)_xH$$

or $$R—O—(C_3H_6O)_xH$$

wherein R is $C_1$ to $C_8$ alkyl and x is greater than 4.

9. A method according to claim 8 wherein R is methyl, ethyl, propyl, or butyl.

10. A method according to claim 9 wherein the polyoxyalkylene glycol ether is n-butoxy polyalkylene glycol ether.

11. A method according to claim 1 wherein the composition further comprises up to 20 wt % of at least one additive selected from the group consisting of terpenes, terpene alcohols, $C_8$–$C_{14}$ alcohol acetate ester blends, glycols, diacid esters, and petroleum hydrocarbons.

12. A method according to claim 1 further comprising up to 10 wt % of a surfactant.

13. A method according to claimn 12 wherein the surfactant is selected from the group of ethoxylated nonylphenols, linear alcohol ethoxylates, and alkanolamine salts of dodecylbenzene sulfonic acid.

14. A method according to claim 1 wherein the fatty acid alkyl ester blend is present in amounts of about 50 to 95 wt %.

15. A method according to claim 1 wherein the composition further comprises at least 1 wt % of an antioxidant.

* * * * *